No. 861,879. PATENTED JULY 30, 1907.
J. A. McLANE.
PROCESS OF MAKING WIRE GLASS.
APPLICATION FILED NOV. 24, 1906.
2 SHEETS—SHEET 2.
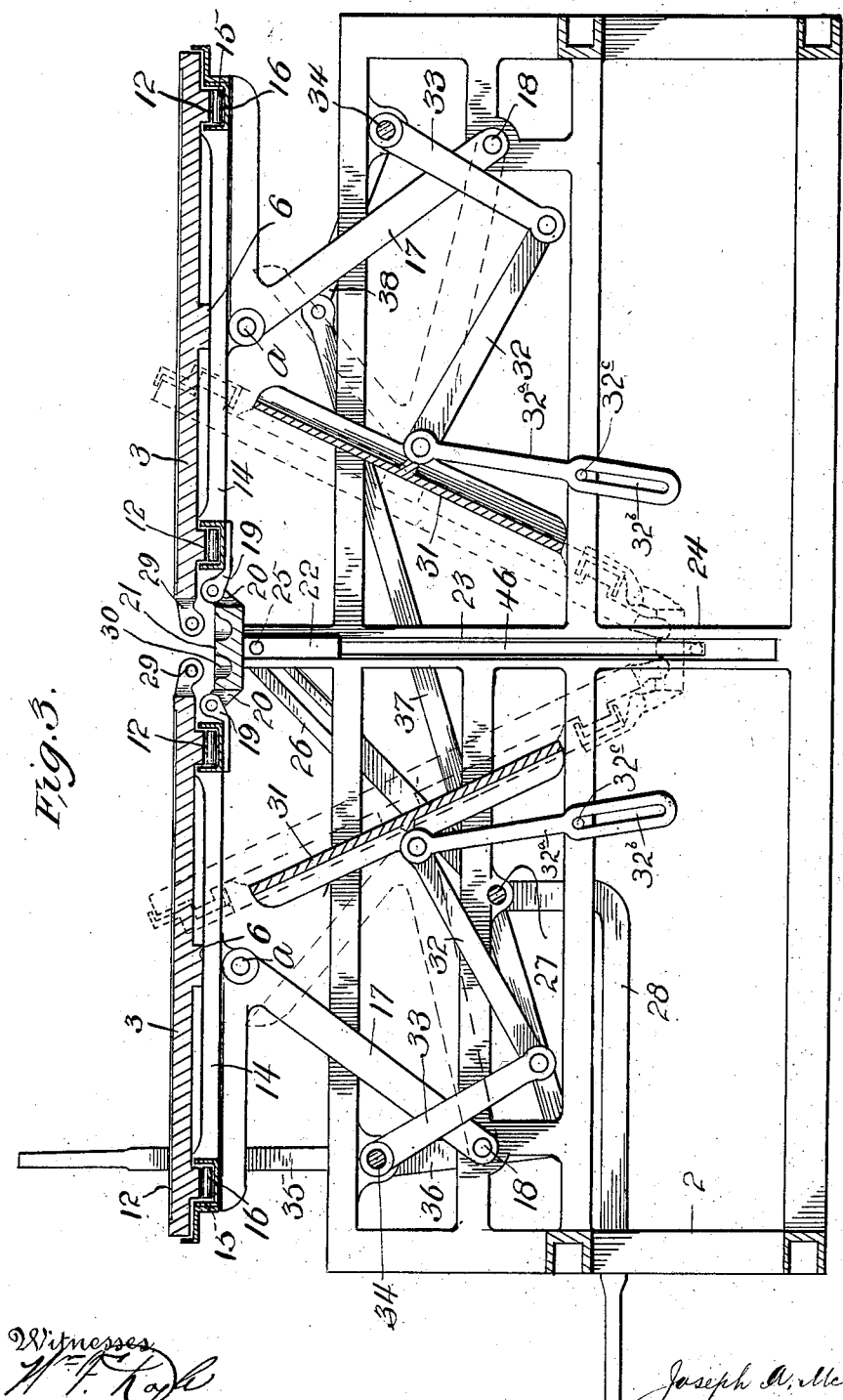

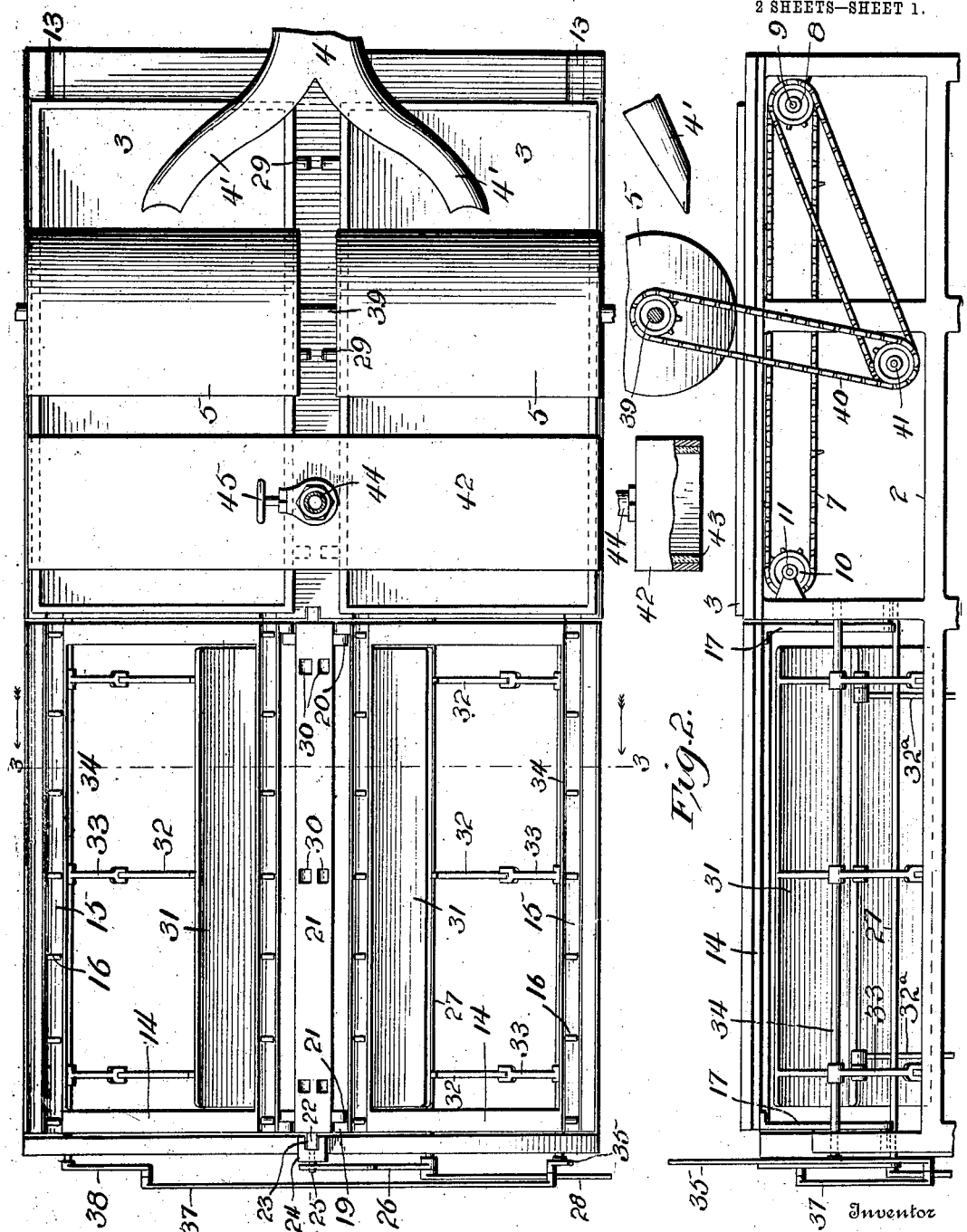

UNITED STATES PATENT OFFICE.

JOSEPH A. McLANE, OF GRAFTON, WEST VIRGINIA, ASSIGNOR OF ONE-HALF TO JOSEPH H. McDERMOTT, OF MORGANTOWN, WEST VIRGINIA.

PROCESS OF MAKING WIRE-GLASS.

No. 861,879.   Specification of Letters Patent.   Patented July 30, 1907.

Application filed November 24, 1906. Serial No. 344,940.

To all whom it may concern:

Be it known that I, JOSEPH A. McLANE, a citizen of the United States, residing at Grafton, in the county of Taylor and State of West Virginia, have invented a certain new and useful Process of Making Wire-Glass, of which the following is a specification.

My invention relates to the manufacture of wire glass, its object being to insure the perfect welding together of the two sheets of glass around the interposed wire netting to form the finished plate, to do away with the imperfections in the finished plate arising from contact with the roll spreading the glass into sheet form, which leaves imprinted on it the imperfections of the roll or pressing medium, and forms a chill skin which on exposure to the atmosphere immediately sets, and when chilled is readily recognized and is technically known as a "mat glaze" and the sheet with such surface being united with another sheet of glass in inclosing the wire netting between the two blurs and deadens the natural transparency of the glass plate, making it imperfect, and interfering to some extent with the passage of light through the same. Another further difficulty in the manufacture of wire glass is that in the rolling of one sheet, the application of the wire netting thereto, and the immediate rolling of another sheet on the same, on account of the cooling action upon one or both layers and the difference in co-efficient of expansion of the wire and the glass, strains are liable to be set up within the finished plate, which are liable to lead to breakage. By the present invention it is believed that such difficulties are largely overcome and the manufacture of a higher quality of wire glass obtained.

To these ends the invention consists, generally stated, in rolling a sheet or layer of glass, reheating the exposed surface thereof, applying the wire netting, and uniting the said sheet with another sheet to produce the finished plate of wire glass.

One specific method of practicing the invention is accomplished by flowing or teeming the molten glass upon two casting platens, such as by dividing the stream leading from the refining chamber of a continuous or other tank, so simultaneously rolling two sheets, reheating the exposed surfaces of the two sheets, applying the wire netting to one of said sheets and then bringing said sheets together with the wire netting interposed, so as to cause them to coalesce into a single finished plate of wire glass.

In the accompanying drawings Figures 1, 2, and 3 illustrate apparatus suitable for the practice of the invention where two sheets are simultaneously rolled, the wire interposed, and the sheets pressed together, Fig. 1 being a plan view of the apparatus, Fig. 2 a side elevation of the same, and Fig. 3 a vertical section on the line 3—3 of Fig. 1 looking in the direction of the arrow.

Referring to the drawings 2 represents a frame which forms a stationary table or supporting bed for the casting platens 3, and 4 a hopper which receives the molten glass from the refining chamber of a continuous or other tank. The tank is not shown for the reason that any of the usual or preferred type of tank or pot may be used with equally good result. The hopper, 4, as clearly shown in Figs. 1 and 2, is provided or formed with the two diverging spouts 4' which incline downwardly and forwardly toward the table over which they extend and are arranged so as to deposit the molten glass on the casting platens 3 at a point immediately in front of and adjacent to the rollers 5 which press and roll the masses into sheets. The platens, 3, are caused to move forward and under the rollers by any preferred or suitable means.

In Fig. 3 I show a rib 6, one of a series, cast on the bottom of the platens which may be engaged by a sprocket chain 7 operated by sprocket wheels 8 on the drive shaft 9 and extending over similar wheels 10 carried by a shaft 11, but any suitable or preferred means, either mechanical or manual, may be employed to move the platens. The platens are also formed with the longitudinal tracks or ways 12 which enter channels 13 in the top of the frame 2 in order to guide them in their movement on the frame.

Adjoining the delivery end of the stationary table or bed is arranged what may be termed dumping tables 14, onto which the platens are moved from the stationary table by the sprocket chains. The tables, 14, consist of a rectangular frame which is formed with a guide channel 15 similar to the channels 13 and in line therewith. The channels 13 and 15 are provided with a series of rollers 16 on which the tracks or ways 12 rest and travel. The tables 14 are supported normally in a horizontal position by the pivoted brackets 17 to which said tables are pivotally attached at a point about midway therewith, as at $a$, the long arms of said brackets being pivotally connected at their ends to the frame at 18.

The adjacent edges or sides of the tables 14 are provided with the lugs 19 by which they are pivotally attached to the lugs 20 which project laterally from the sides of a cross-head 21 which extends longitudinally between said tables. The cross-head is formed or provided with a downward extension 22 at each end which fits slidably in the vertical grooves 23 formed in the uprights 24 of the frame 2. A horizontal shaft 25 connects the extensions 22; through a vertical slot 46 in the uprights 24, and on the ends of the said shaft the free ends of the slotted levers 26 work. The other ends of the levers 26 are secured to a shaft 27 having its bearings in one of the cross beams of the frame 2. To the shaft 27 a foot or hand lever 28 is secured by the movement of which the cross-head is caused to travel vertically between the uprights 24, and thus tilt the tables 14 to the position indicated in dotted lines, Fig. 3.

The adjacent sides or edges of the platens are formed or provided with the slightly downwardly curving lugs 29 which enter the recesses or pockets 30, formed in the upper surface of the cross-head, when the same is lowered between the uprights 24 in order to support said platens in their inclined and vertical positions.

A pressure plate 31, is arranged at each side of the longitudinal center of the apparatus for the purpose of forcibly bringing the platens 3 together and thus press the sheets carried by the platens against each other to cause them to coalesce into a single sheet. This is accomplished by supporting the plates in position by slotted links 32ª which are pivotally connected to the pressure plate and through slots 32ᵇ to shafts or rods 32ª fixed at both ends to the frame, and pivotally connecting each of the plates 31 to levers 32, the free ends of which are pivotally connected to the ends of levers 33, and the other ends of which are secured to shafts 34 journaled in bearings on the frame 2. To one of the shafts 34 is secured a hand lever 35 having an extension 36 which is connected to the end of a long lever 37 which extends to and is pivotally connected with a short lever 38 which is secured to the other shaft 34. By depressing the hand lever 35 the shafts 34 are turned in their bearings and the levers 32 and 33 operated to exert a toggle action on the pressure plates 31 causing the latter to engage the platens 3 within the frame of the tables 14 and lifting the platens to a vertical position and bringing the sheets carried by the platens into contact. A reverse movement of the hand lever 35 releases the pressure in the plates 31 and returns them with the tables 14 and platens to an inclined position while a similar movement of the lever 28 lifts the tables and platens to a horizontal position. The finished sheet of glass remains on one or the other of the platens and is ready to be carried off to the annealing chamber, for which purpose I show the lugs 29 as perforated in order to provide for the ready attachment thereto of tongs for moving the same.

The rollers 5 are preferably mounted on the same shaft 39, and the latter is operated by belt or chain connection 40, from a shaft 41, driven from the drive shaft 9 as shown in Fig. 2.

The heating medium consists of a burner which in this instance is shown as a rectangular box or casing 42 extending across the apparatus and suitably supported at the desired height above the platens and at the proper distance from the rollers and designed to direct the heating flame downwardly. The casing is lined with a suitable refractory material 43 and a suitable fuel, either liquid or gaseous, is delivered to the same under pressure through the pipe 44 which is provided with a cut-off valve and hand wheel 45 for operating the same.

In practicing my invention in connection with the apparatus above described the molten glass is delivered from the refining chamber in a homogeneous mass to the hopper from which it is delivered onto the casting platens at points immediately in front of the rollers. The molten glass is divided as it leaves the hopper and is delivered in separate batches for each half sheet to the platens. The platens are then simultaneously moved forward and under the rollers, the latter acting to press or roll the molten glass into sheets of a thickness equaling generally about one-half the desired thickness of the finished product and as the sheets leave the rollers they immediately pass under the reheating flame, thus exposing their upper surfaces to the intense heat of the downwardly impinging flame and thereby superficially remelting the surfaces of the sheets, and removing all the imperfections formed thereon by the rollers, and raising and maintaining a more equable degree of temperature in the sheets which assures a rapid and perfect fusion or welding of the sheets when they are brought together to form the product. The wire netting is provided in the proper length and width and is applied to one of the half sheets immediately after it has passed from under the heating flame and the platens containing the half sheets are quickly brought to a vertical position, with the exposed surfaces of the sheets facing toward each other, and power is exerted to press them together, thereby sandwiching the netting between the sheets and embedding the same therein. When the pressure is released the completed plate is removed to a tempering leer and annealed.

By my invention I am thus enabled to produce glass in which perfect union of the two sheets forming the glass and inclosing the wire netting is assured, because of the maintaining of the surface or surfaces at a welding heat at the time of union; and in which the blurring or deadening of the natural transparency of the glass caused by the mat glaze is overcome, while the glass can be produced more cheaply and the cost of finishing is also reduced.

What I claim as my invention is:

1. The process of making wire glass which consists in forming two sheets from molten glass, reheating the exposed surfaces of both sheets to a welding temperature, applying a wire netting to one of said sheets, bringing the reheated surfaces of said sheets into contact, and pressing the same together.

2. The process of making wire glass which consists in simultaneously forming two sheets from molten glass, simultaneously remelting the exposed surfaces of said sheets, applying a wire netting to one of said sheets, bringing the exposed surfaces of said sheets into contact, and then pressing them firmly together.

3. The process of making wire glass which consists in simultaneously forming molten glass into two sheets, simultaneously remelting the exposed surfaces of said sheets while in process of formation, applying a metal reinforcing netting to one of said sheets, and pressing the two sheets together to form a single sheet with the netting embedded therein.

4. The process of making wire glass which consists in forming two sheets from molten glass, reheating the exposed surfaces of the sheets to a welding temperature, applying a wire netting to one of said sheets, bringing the exposed surfaces of said sheets into contact, and pressing the same together.

5. The process of making wire glass which consists in forming two sheets from molten glass, reheating the exposed surfaces of said sheets, applying a wire netting to one of said sheets, bringing said sheets to a vertical position to bring their exposed surfaces into contact, and then pressing them firmly together.

6. The process of making wire glass which consists in forming molten glass in two sheets, remelting the exposed surfaces of said sheets while in process of formation, applying a metal reinforcing netting to one of said sheets, and pressing the two sheets together to form a single sheet with the netting embedded therein.

In testimony whereof, I affix my signature, in the presence of two witnesses.

JOSEPH A. McLANE.

Witnesses:
FRANK F. BROWN,
WILLIAM A. McLANE.